(12) United States Patent
Park et al.

(10) Patent No.: US 7,514,984 B2
(45) Date of Patent: Apr. 7, 2009

(54) CHARGE PUMPING CIRCUIT AND DIRECT CURRENT CONVERTING APPARATUS USING THE SAME

(75) Inventors: Yong Sung Park, Seoul (KR); Oh Kyong Kwon, Seoul (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 0 days.

(21) Appl. No.: 11/270,051

(22) Filed: Nov. 9, 2005

(65) Prior Publication Data
US 2006/0119419 A1 Jun. 8, 2006

(30) Foreign Application Priority Data
Nov. 11, 2004 (KR) ...................... 10-2004-0091768

(51) Int. Cl.
*G05F 1/10* (2006.01)
*G05F 3/02* (2006.01)

(52) U.S. Cl. ..................................................... 327/536

(58) Field of Classification Search ................. 327/536; 363/59–60
See application file for complete search history.

(56) References Cited

U.S. PATENT DOCUMENTS

| 5,140,182 | A | * | 8/1992 | Ichimura | ..................... 327/536 |
| 5,432,469 | A | * | 7/1995 | Tedrow et al. | ............... 327/306 |
| 5,572,735 | A | | 11/1996 | Tanikawa | ..................... 395/750 |
| 5,912,560 | A | * | 6/1999 | Pasternak | ..................... 324/536 |
| 6,049,200 | A | * | 4/2000 | Hayashimoto | ............... 323/269 |
| 6,177,830 | B1 | * | 1/2001 | Rao | ............................ 327/536 |
| 6,373,325 | B1 | * | 4/2002 | Kuriyama | ..................... 327/536 |
| 2002/0024377 | A1 | * | 2/2002 | Ogura | ......................... 327/536 |
| 2005/0086552 | A1 | | 4/2005 | Matsubara | .................. 713/340 |

FOREIGN PATENT DOCUMENTS

| JP | 03-022560 | | 1/1991 |
| JP | 07-066700 | | 10/1995 |
| JP | 10-243636 | | 9/1998 |
| JP | 11-110989 | | 4/1999 |
| JP | 2001136733 A | * | 5/2001 |
| JP | 2003-332441 | | 11/2003 |

OTHER PUBLICATIONS

Office Action, issued by JPO, dated Mar. 11, 2008, 2 pages.

* cited by examiner

*Primary Examiner*—Quan Tra
(74) *Attorney, Agent, or Firm*—Knobbe, Martens, Olson & Bear LLP

(57) ABSTRACT

Embodiments of a charge pumping circuit insensitive to change in the threshold voltage of a transistor and a direct current converting apparatus employing the charge pumping circuit are disclosed. One embodiment of the charge pumping circuit comprises a source transistor configured to receive and output an input voltage in accordance with a clock signal, a driver configured to drive the source transistor using the input voltage, the first clock signal, and a second clock signal different from the first clock signal, and a voltage pumping unit configured to increase the source transistor output voltage from the source transistor in stages in accordance with the first and second clock signals. The charge pumping circuit may be employed in a direct current converting circuit so that it is insensitive to the threshold voltage of a transistor.

18 Claims, 2 Drawing Sheets

US 7,514,984 B2

CHARGE PUMPING CIRCUIT AND DIRECT CURRENT CONVERTING APPARATUS USING THE SAME

CROSS-REFERENCE TO RELATED APPLICATIONS

This application claims the benefit of Korean Patent Application No. 10-2004-91768, filed on Nov. 11, 2004, in the Korean Intellectual Property Office, the disclosure of which is incorporated herein by reference.

BACKGROUND

1. Field of the Invention

The present invention relates to a charge pumping circuit. More particularly, the invention relates to a charge pumping circuit insensitive to change in the threshold voltage of a transistor, and a direct current converting apparatus using the same.

2. Discussion of Related Technology

A conventional charge pumping circuit is configured to output a voltage with a higher level than the voltage supplied from a power source. Charge pumping circuits can be employed as a back-bias voltage generator of a semiconductor device, such as a dynamic random access memory (DRAM), and a voltage generator for generating voltage for writing and erasing programs in the cells of an erasable programmable read-only memory (EPROM), an electrically erasable programmable read-only memory (EEPROM), and a flash memory device.

FIG. 1 is a circuit diagram illustrating an exemplary charge pumping circuit 10. Referring to FIG. 1, the charge pumping circuit 10 includes a source transistor MS and a voltage pumping unit 12. The source transistor MS is connected to an input terminal Vin, supplying an input voltage Vdd, to operate as a diode so that the source transistor MS supplies the input voltage Vdd to the voltage pumping unit 12.

The voltage pumping unit 12 comprises first through fourth transmission transistors M1-M4 and first through fourth capacitors C1-C4. The first to fourth transmission transistors M1-M4 are connected to the output port of the source transistor MS in a series configuration. In the exemplary circuit 10, the source transistor MS and the first to fourth transmission transistors M1-M4 are n-type metal-oxide semiconductor field effect transistors (NMOSFET).

The first electrode of the first capacitor C1 is connected to a first node N1 between the source transistor MS and the first transmission transistor M1. The second electrode of the first capacitor C1 is connected to a first clock signal line CL1 to which a first clock signal CLK1 is supplied.

The first electrode of the second capacitor C2 is connected to a second node N2 between the first transmission transistor M1 and the second transmission transistor M2. The second electrode of the second capacitor C2 is connected to a second clock signal line CL2 to which a second clock signal CLK2 is supplied.

The first electrode of the third capacitor C3 is connected to a third node N3 between the second transmission transistor M2 and the third transmission transistor M3. The second electrode of the third capacitor C3 is connected to the first clock signal line CL1 to which the first clock signal CLK1 is supplied.

The first electrode of the fourth capacitor C4 is connected to a fourth node N4 between the third transmission transistor M3 and the fourth transmission transistor M4. The second electrode of the fourth capacitor C4 is connected to the second clock signal line CL2 to which the second clock signal CLK2 is supplied.

The first clock signal CLK1 supplied to the first clock signal line CL1 and the second clock signal CLK2 supplied to the second clock signal line CL2 are two-phase clock signals having a phase difference of 18020 .

The gate electrodes of the series connected first to fourth transmission transistors M1-M4 are connected to the source electrodes thereof to operate as diodes. More particularly, the gate electrode of the first transmission transistor M1 is connected to the first node N1, the gate electrode of the second transmission transistor M2 is connected to the second node N2, the gate electrode of the third transmission transistor M3 is connected to the third node N3, and the gate electrode of the fourth transmission transistor M4 is connected to the fourth node N4.

The voltage pumping unit 12 is configured to pump the input voltage Vdd output from the source transistor MS in stages using the first to fourth transmission transistors M1-M4, in accordance with the first and second clock signals CLK1 and CLK2, to output the pumped voltage to the final output terminal Vout.

Thereby, the input voltage Vdd supplied to the charge pumping circuit 10 has a higher level at the final output terminal Vout due to an increase in pumping time, which is generated by the first and second clock signals CLK1 and CLK2.

The input voltage Vdd is charged at the first node N1 of the charge pumping circuit 10 through the source transistor MS, which is connected to the input terminal Vin to operate as a diode. Therefore, the voltage at the first node is related to the input voltage Vdd according to Equation 1, wherein, $V_{N1}$, Vth, and $V_{CLK1}$ represent the voltage at the first node N1, the threshold voltage of the source transistor MS, and the voltage of the first clock signal CLK1.

$$V_{N1} = Vdd - Vth + V_{CLK1} \tag{1}$$

Because the charge pumping circuit 10 is sensitive to the threshold voltage Vth of the source transistor MS, which may be too high in relation to the input voltage for the source transistor MS to operate optimally, pumping efficiency deteriorates.

SUMMARY OF CERTAIN INVENTIVE EMBODIMENTS

Accordingly, one object of the present invention is to provide a charge pumping circuit insensitive to change in the threshold voltage of a transistor, and a direct current converting circuit employing the charge pumping circuit.

One embodiment of a charge pumping circuit comprises a source transistor configured to output an input voltage in accordance with a first clock signal, a driver configured to drive the source transistor using the input voltage, the first clock signal, and a second clock signal different from the first clock signal, and a voltage pumping unit configured to increase the voltage output from the source transistor in stages in accordance with the first and second clock signals.

In certain embodiments, the driver electrically connects the gate and source of the source transistor to each other in accordance with the first clock signal and supplies the voltage obtained by the sum of the input voltage and the voltage of the second clock signal to the gate of the source transistor in accordance with the second clock signal. In one embodiment, the driver comprises a switching transistor, controlled by the first clock signal, and connected between the gate and source of the source transistor and a source capacitor, wherein a first electrode of the source capacitor is connected to the gate of the source transistor, and wherein the first clock signal is supplied to a second electrode of the source capacitor. In some embodiments, the voltage pumping unit comprises a plurality of transmission transistors connected to the output port of the source transistor, and a plurality of capacitors connected to nodes between the source transistor and the plurality of transmission transistors so as to be charged and discharged in accordance with the first and second clock signals.

Another embodiment of a charge pumping circuit comprises a source transistor configured to output an input voltage in accordance with a voltage applied between the gate and source thereof, and a plurality of transmission transistors connected to the output terminal of the source transistor. The charge pumping circuit further comprises a switching transistor controlled by a first clock signal and connected between the gate and source of the source transistor, and a plurality of capacitors electrically connected to nodes between the plurality of transmission transistors. The plurality of capacitors comprises odd and even capacitors, wherein the even capacitors are configured to receive the first clock signal and the odd capacitors are configured to receive a second clock signal different from the first clock signal. The charge pumping circuit also comprises a source capacitor connected between the gate of the source transistor and configured to receive the first clock signal.

One embodiment of a direct current converting apparatus using a charge pumping circuit comprises a charge pumping circuit as described above, wherein the charge pumping circuit is configured to increase an input voltage in stages in accordance with first and second clock signals. The direct current converting apparatus further comprises a comparing unit configured to compare a reference voltage with the charge pumping circuit output voltage and to output a comparison signal, and a clock signal generator configured to generate the first and second clock signals using the comparison signal from the comparing unit.

In certain embodiments, the direct current converting apparatus further comprises a voltage distributing unit configured to distribute the output voltage and to supply a distributed output voltage to the comparing unit. In one embodiment, the clock signal generator comprises a reference clock configured to generate a reference clock signal using a feedback signal from the output terminal thereof and the comparison signal, and a clock buffer configured to generate and buffer the first and second clock signals based on the reference clock in order to supply buffered clock signals.

DETAILED DESCRIPTION CERTAIN INVENTIVE EMBODIMENTS

The following detailed description is directed to certain specific embodiments of the invention. However, the invention can be embodied in a multitude of different ways as defined and covered by the claims. In this description, reference is made to the drawings wherein like parts are designated with like numerals throughout.

Figure 1:
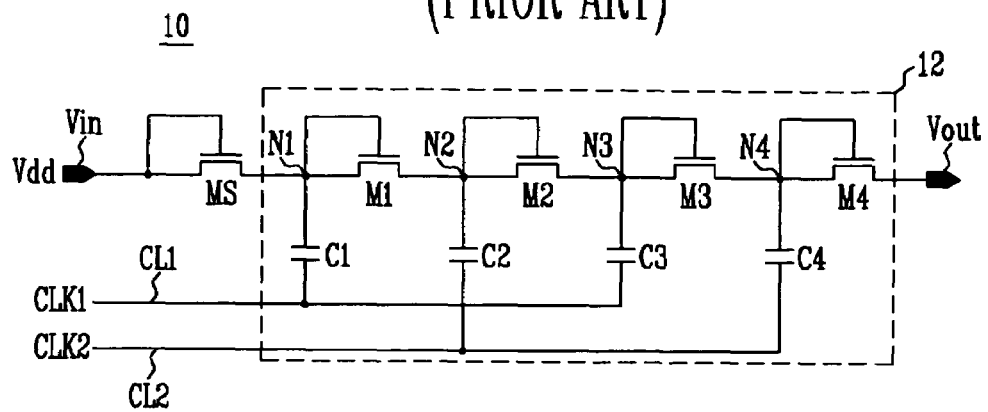
FIG. 1 is a circuit diagram of an exemplary charge pumping circuit.
Figure 2:
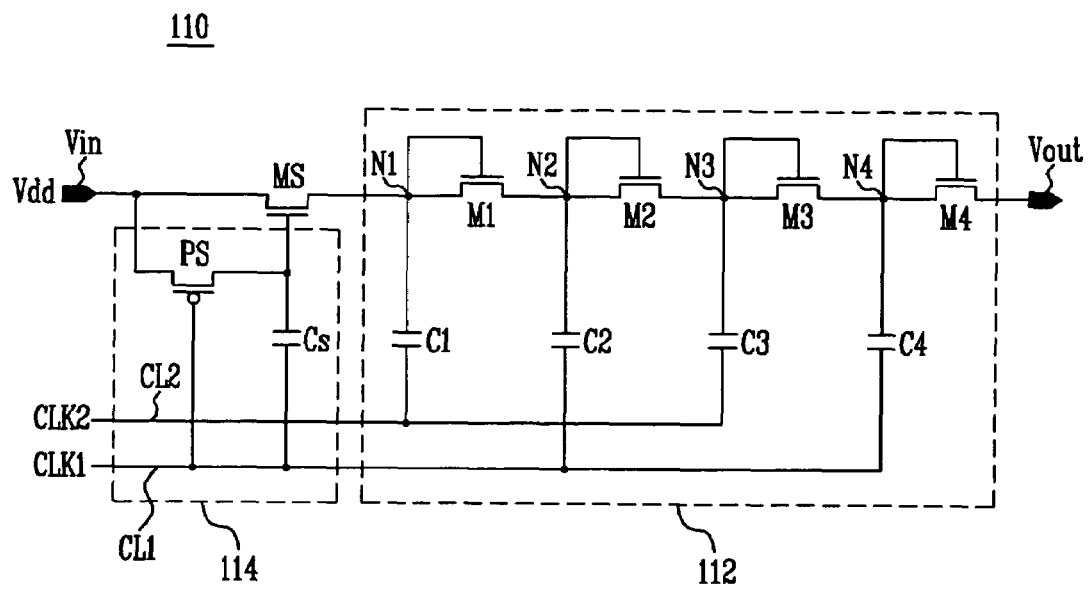
FIG. 2 is a circuit diagram of one embodiment of a charge pumping circuit according to the invention.

FIG. 2 is a circuit diagram of one embodiment of a charge pumping circuit 110. Referring to FIG. 2, the charge pumping circuit 110 comprises a source transistor MS, a voltage pumping unit 112, and a driver 114.

A source electrode of the source transistor MS is connected to the input terminal Vin and a drain electrode of the source transistor MS is connected to the voltage pumping unit 112. A gate electrode of the source transistor MS is electrically connected to the driver 114. The driver 114 is configured to drive the source transistor MS to supply the input voltage Vdd at the input terminal Vin to the voltage pumping unit 112.

The driver 114 comprises a switching transistor PS and a source capacitor Cs. A source electrode of the switching transistor PS is connected to the input terminal Vin and a drain electrode of the switching transistor PS is connected to the gate electrode of the source transistor MS. A gate electrode of the switching transistor PS is connected to the first clock signal line CL1. In one embodiment, the switching transistor PS is a transistor of a type different from the source transistor MS. For example, the switching transistor PS may be an n-type transistor and the source transistor MS may be a p-type transistor. In the illustrated embodiment, the switching transistor PS is a p-type transistor and the source transistor MS is an n-type transistor. The switching transistor PS is configured to supply the input voltage Vdd to the gate electrode of the source transistor MS in accordance with the first clock signal CLK1 supplied to the first clock signal line CL1.

A first electrode of the source capacitor Cs is connected to the gate electrode of the source transistor MS, and a second electrode of the source capacitor Cs is connected to the first clock signal line CL1. The source capacitor Cs is configured to charge the input voltage Vdd supplied to the first electrode thereof in accordance with the first clock signal CLK1, and supply the charged voltage to the gate electrode of the source transistor MS.

The driver 114 is configured to drive the source transistor MS in accordance with the first clock signal CLK1. More specifically, the driver 114 turns on the switching transistor PS in response to the first clock signal CLK1 at a low level to thereby charge the input voltage Vdd in the source capacitor Cs. The driver then turns off the switching transistor PS in response to the first clock signal CLK1 at a high level. Thus, the driver 114 turns on the source transistor MS using a combination of the first clock signal CLK1 at a high level and the voltage charged in the source capacitor Cs.

The voltage pumping unit 112 includes first to fourth transmission transistors M1-M4 and first to fourth capacitors C1-C4. The first to fourth transmission transistors M1 to M4 are connected to the output port of the source transistor MS in a series configuration. In one embodiment, the source transistor MS and the first to fourth transmission transistors M1 to M4 are n or p-type metal-oxide semiconductor field effect transistors (MOSFETs). In the described embodiment, the source transistor MS and the first to fourth transmission transistors M1 to M4 are n-type transistors.

The first electrode of the first capacitor C1 is connected to a first node N1 between the source transistor MS and the first transmission transistor M1. The second electrode of the first capacitor C1 is connected to the second clock signal line CL2 to which the second clock signal CLK2 is supplied.

The first electrode of the second capacitor C2 is connected to a second node N2 between the first transmission transistor M1 and the second transmission transistor M2. The second electrode of the second capacitor C2 is connected to the first clock signal line CL1.

The first electrode of the third capacitor C3 is electrically to a third node N3 between the second transmission transistor M2 and the third transmission transistor M3. The second electrode of the third capacitor C3 is connected to the second clock signal line CL2.

The first electrode of the fourth capacitor C4 is connected to a fourth node N4 between the third transmission transistor M3 and the fourth transmission transistor M4. The second electrode of the fourth capacitor C4 is connected to the first clock signal line CL1.

In one embodiment, the first clock signal CLK1 and the second clock signal CLK2 are two-phase clock signals having a phase difference of 180°.

In one embodiment, the gate electrodes of the first to fourth transmission transistors M1 to M4 are electrically connected to the source electrodes thereof such that each transistor M1-M4 operates as a diode. Specifically, the gate electrode of the first transmission transistor M1 is connected to the first node N1, the gate electrode of the second transmission transistor M2 is connected to the second node N2, the gate electrode of the third transmission transistor M3 is connected to the third node N3, and the gate electrode of the fourth transmission transistor M4 is connected to the fourth node N4.

The voltage pumping unit 112 is configured to pump the output voltage from the source transistor MS in stages, using the first to fourth transmission transistors M1 to M4, in accordance with the first and second clock signals CLK1 and CLK2 to thereby output the pumped input voltage Vdd to the final output terminal Vout. More particularly, the voltage pumping unit 112 is configured to pump the voltages of the charged and discharged first to fourth capacitors C1 to C4 in stages, using the first to fourth transmission transistors M1 to M4 and in accordance with the first and second clock signals CLK1 and CLK2, so as to output the pumped voltages to the final output terminal Vout.

Because the source transistor MS in the charge pumping circuit 110 is driven using the driver 114, the first node N1 is charged without being affected by the threshold voltage Vth of the source transistor MS. Thus, the charge pumping circuit 110 raises the output voltage from the source transistor MS, in comparison to the input voltage Vdd, in stages using the voltage pumping unit 112 in accordance with the first and second clock signals CLK1 and CLK2, thereby propagating the input voltage Vdd to the final output terminal Vout.

As a result, the input voltage Vdd supplied to the charge pumping circuit 110 has a higher level toward the final output terminal Vout with an increase in the pumping time caused by the first and second clock signals CLK1 and CLK2, wherein the output voltage is unaffected by the threshold voltage Vth of the source transistor MS.

Figure 3:
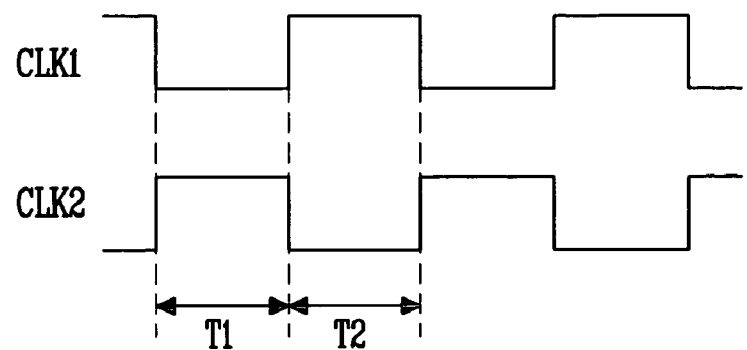
FIG. 3 is an illustration of clock signal waveforms for driving the charge pumping circuit of FIG. 2.

FIG. 3 is an illustration of exemplary waveforms of the first and second clock signals CLK1 and CLK2 for driving the charge pumping circuit 110 of FIG. 2. In reference to FIG. 3, in a period T1 the first clock signal CLK1 is at a low level and the second clock signal CLK2 is at a high level, such that the switching transistor PS is turned on by the first clock signal CLK1 in period T1. Also in period T1, the input voltage Vdd is supplied to the gate electrode of the source transistor MS through the switching transistor PS. Accordingly, in period T1, the input voltage Vdd is supplied to the gate and source electrodes of the source transistor MS such that the source transistor MS is turned off. Also during period T1, the source capacitor Cs charges to the input voltage Vdd.

The first and third capacitors C1 and C3 charge the second clock signal CLK2 to a high level, and the second and fourth capacitors C2 and C4 discharge the charged voltage by the first clock signal CLK1 at a low level during period T1.

Therefore, in period T1, the voltage pumping unit 112 pumps the voltage of the first node N1 in stages using the driving of the first to fourth transmission transistors M1 to M4, which is caused by the charge and discharge of the first to fourth capacitors C1 to C4 in accordance with the first and second clock signals CLK1 and CLK2, to output the pumped voltage to the final output terminal Vout.

Following period T1 is a period T2, wherein the first clock signal is at a high level and the second clock signal is at a low level. During period T2, the switching transistor PS is turned off by the first clock signal CLK1 at the high level, and the source transistor MS is turned on by the sum of the voltage of the first clock signal CLK1 at a high level and the voltage stored in the source capacitor Cs. Accordingly, in period T2, the source transistor MS supplies the input voltage Vdd to the first node N1 without being affected by the threshold voltage Vth of the source transistor MS.

Also during period T2, the first and third capacitors C1 and C3 discharge in response to the second clock signal CLK2 at a low level, and the second and fourth capacitors C2 and C4 are charged by the first clock signal CLK1 at a high level. Clock periods T1 and T2 are repeated so as to output the pumped voltage.

Therefore, during period T2, the voltage pumping unit 112 pumps the voltage at the first node N1 in stages using the first to fourth transmission transistors M1 to M4, which are driven by the charge and discharge of the first to fourth capacitors C1 to C4 in accordance with the first and second clock signals CLK1 and CLK2, to output the pumped voltage to the final output terminal Vout. As a result, in period T2, the charge pumping circuit 110 supplies the input voltage Vdd to the first node N1 using the driver 114, without being affected by the threshold voltage Vth of the source transistor MS, and pumps the voltage of the first node N1 in stages using the voltage pumping unit 112 in accordance with the first and second clock signals CLK1 and CLK2 to output the pumped voltage to the final output terminal Vout.

Figure 4:
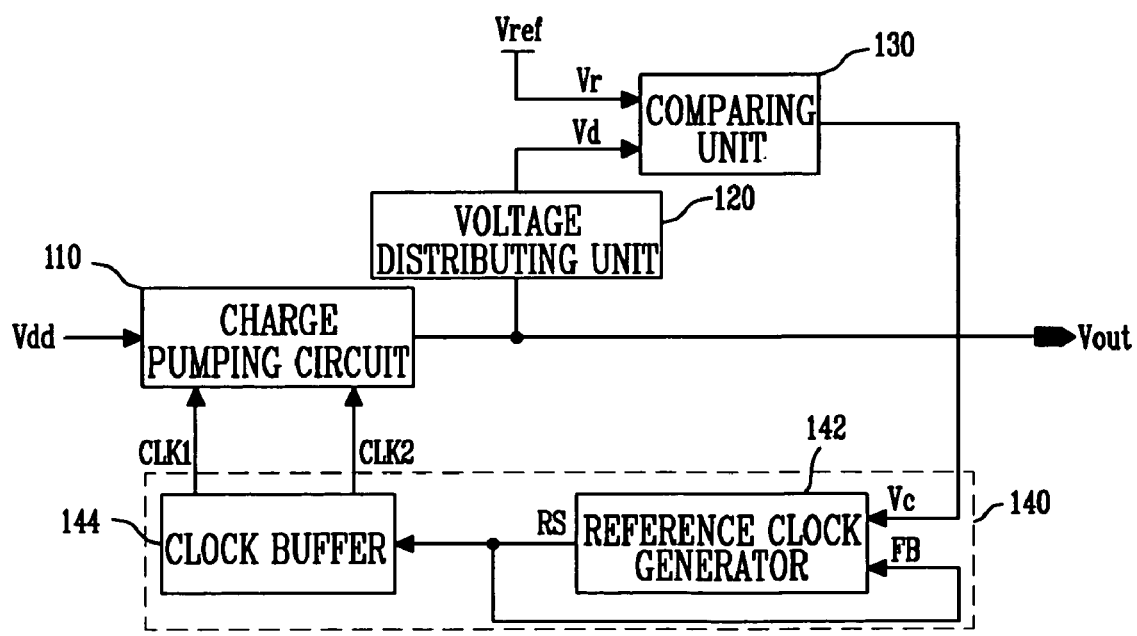
FIG. 4 is a block diagram of one embodiment of a direct current converting circuit employing a charge pumping circuit according to one embodiment of the invention.

FIG. 4 is a block diagram illustrating one embodiment of a direct current converting apparatus employing the charge pumping circuit according to an embodiment of the invention. Referring to FIG. 4, the direct current converting apparatus comprises the charge pumping circuit 110, a voltage distributing unit 120, a comparing unit 130, and a clock signal generator 140.

As described above in reference to FIG. 2, the charge pumping circuit 110 pumps the input voltage Vdd in stages in accordance with the first and second clock signals CLK1 and CLK2, supplied by the clock signal generator 140, in order to output the pumped voltage Vout.

The voltage distributing unit 120 distributes the charge pumping circuit output voltage Vout and supplies the distribution voltage Vd to the comparing unit 130.

The comparing unit 130 receives the distribution voltage Vd and a reference voltage Vr from reference voltage source Vref. The comparing unit 130 compares the reference voltage Vr with the distribution voltage Vd and generates a comparison signal Vc corresponding to the comparison result to the clock signal generator 140.

The clock signal generator 140 comprises a reference clock generator 142 and a clock buffer 144. The reference clock generator 142 is configured to generate a reference clock signal RS using a feedback signal FB from the output terminal thereof and the comparison signal Vc from the comparing unit 130. The clock buffer 144 is configured to generate the first and second clock signals CLK1 and CLK2 based on the reference clock signal RS, supplied from the reference clock generator 142, and to buffer the generated first and second clock signals CLK1 and CLK2 to supply the buffered first and second clock signals CLK1 and CLK2 to the charge pumping circuit 110. In one embodiment, the first and second clock signals CLK1 and CLK2 are two-phase clock signals having a phase difference of 180°.

The direct current converting apparatus employing the charge pumping circuit according to an embodiment of present invention generates a desired output voltage Vout using the charge pumping circuit 110 and the first and second clock signals CLK1 and CLK2, the distribution voltage Vd of the output voltage Vout, and the reference voltage Vr. Thereby, a charge pumping circuit insensitive to change in the threshold voltage of a transistor and a direct current converting apparatus using the same are provided.

Embodiments of the charge pumping circuit according to the invention significantly increase the input voltage, and the voltage supplied to the gate electrode of the source transistor that supplies the input voltage to a next port using the clock signals, such that the input voltage is supplied to the next port without being affected by the threshold voltage of the source transistor. Thereby, the charge pumping circuit pumps the input voltage in stages in accordance with the first and second clock signals without being affected by the threshold voltage of the source transistor, to subsequently output the pumped input voltage. The charge pumping circuit may be employed in a direct current converter, such that the direct current converter is insensitive to the threshold voltage of the transistor.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A charge pumping circuit comprising:
    a source transistor configured to output an input voltage in accordance with a first clock signal;
    a source capacitor, comprising a first electrode connected to the gate of the source transistor and a second electrode configured to receive the first clock signal;
    a driver configured to drive the source transistor using the input voltage, the first clock signal, and a second clock signal different from the first clock signal, the driver comprising a switching transistor controlled by the first clock signal and connected between the gate and drain of the source transistor; and
    a voltage pumping unit configured to increase the voltage output from the source transistor in stages in accordance with the first and second clock signals, each stage having a transmission transistor having the gate and drain thereof electrically shorted, wherein
    the driver is further configured to electrically connect the gate and drain of the source transistor to each other and to supply the input voltage to the gate of the source transistor in accordance with the first clock signal, and to supply a gate voltage to the gate of the source transistor in accordance with the second clock signal, and the source and switching transistors are transistors of different doping types.

2. The charge pumping circuit as claimed in claim 1, wherein the voltage pumping unit comprises:
    a plurality of transmission transistors connected in series to the output port of the source transistor; and
    a plurality of capacitors electrically connected to nodes between the source transistor and the plurality of transmission transistors, wherein the plurality of capacitors are configured to be charged and discharged in accordance with the first and second clock signals.

3. The charge pumping circuit as claimed in claim 2, wherein the plurality of capacitors comprises odd and even capacitors,
    wherein the first clock signal is supplied to odd capacitors among the plurality of capacitors, and
    wherein the second clock signal is supplied to even capacitors among the plurality of capacitors.

4. The charge pumping circuit as claimed in claim 2, wherein the plurality of transmission transistors are configured to operate as diodes.

5. The charge pumping circuit as claimed in claim 1, wherein the first and second clock signals have a phase difference of 180°.

6. The charge pumping circuit as claimed in claim 2, wherein the source transistor and the plurality of transmission transistors are transistors of the same doping type.

7. A charge pumping circuit comprising:
    a source transistor configured to output an input voltage in accordance with a voltage applied between the gate and source of the source transistor;
    a plurality of transmission transistors connected to the output terminal of the source transistor, each of the transmission transistors having the gate and drain thereof electrically shorted;
    a switching transistor controlled by a first clock signal and connected between the gate and drain of the source transistor;
    a plurality of capacitors electrically connected to nodes between the plurality of transmission transistors, wherein even capacitors are configured to receive the first clock signal and odd capacitors are configured to receive a second clock signal different from the first clock signal; and
    a source capacitor connected to the gate of the source transistor and configured to receive the first clock signal, wherein
    the driver is further configured to electrically connect the gate and drain of the source transistor to each other and to supply the input voltage to the gate of the source transistor in accordance with the first clock signal, and to supply a gate voltage to the gate of the source transistor in accordance with the second clock signal, and the source and switching transistors are transistors of different doping types.

8. The charge pumping circuit as claimed in claim 7, wherein the plurality of transmission transistors are configured to operate as diodes.

9. The charge pumping circuit as claimed in claim 7, wherein the first and second clock signals have a phase difference of 180°.

10. A direct current (DC) converting circuit having a charge pumping circuit, the DC converting circuit comprising:
    a charge pumping circuit configured to increase an input voltage in stages in accordance with first and second clock signals, the charge pumping circuit comprising:
        a source transistor configured to output an input voltage in accordance with a first clock signal;

a source capacitor, comprising a first electrode connected to the gate of the source transistor and a second electrode configured to receive the first clock signal;

a driver configured to drive the source transistor using the input voltage, the first clock signal, and a second clock signal different from the first clock signal, the driver comprising a switching transistor controlled by the first clock signal and connected between the gate and drain of the source transistor; and a voltage pumping unit configured to increase the voltage output from the source transistor in stages in accordance with the first and second clock signals, each stage having a transmission transistor having the gate and drain thereof electrically shorted, wherein the driver is further configured to electrically connect the gate and drain of the source transistor to each other and to supply the input voltage to the gate of the source transistor in accordance with the first clock signal, and to supply a gate voltage to the gate of the source transistor in accordance with the first clock signal, and the source and switching transistors are transistors of different doping types;

a comparing unit configured to compare a reference voltage with the output voltage of the charge pumping circuit and to output a comparison signal; and a clock signal generator configured to generate the first and second clock signals using the comparison signal.

11. The DC converting circuit as claimed in claim 10, further comprising a voltage distributing unit configured to distribute the output voltage and supply a distributed output voltage to the comparing unit.

12. The DC converting circuit as claimed in claim 10, wherein the clock signal generator comprises:

a reference clock configured to generate a reference clock signal using a feedback signal from the output terminal thereof and the comparison signal; and a clock buffer configured to generate and buffer the first and second clock signals based on the reference clock to thereby supply buffered clock signals.

13. A direct current (DC) converting circuit using a charge pumping circuit, the DC converting circuit comprising:

a charge pumping circuit for increasing an input voltage in stages in accordance with first and second clock signals, the charge pumping circuit comprising:

a source transistor configured to output the input voltage in accordance with a voltage applied between the gate and source of the source transistor;

a driver configured to drive the source transistor using the input voltage, the first clock signal, and a second clock signal different from the first clock signal, the driver comprising a switching transistor controlled by the first clock signal and connected between the gate and drain of the source transistor, wherein the switching transistor is configured to supply the input voltage to the gate of the source transistor, and wherein the source and switching transistors are of different doping types;

a plurality of transmission transistors connected to the output terminal of the source transistor;

a switching transistor controlled by the first clock signal and connected between the gate and source of the source transistor;

a plurality of capacitors connected to nodes between the plurality of transmission transistors, wherein even capacitors are configured to receive the first clock signal and odd capacitors are configured to receive the second clock signal different from the first clock signal; and a source capacitor connected to the gate of the source transistor and configured to receive the first clock signal;

a comparing unit configured to compare a reference voltage with the output voltage of the charge pumping circuit and to output a comparison signal; and a clock signal generator configured to generate the first and second clock signals using the comparison signal.

14. The DC converting circuit as claimed in claim 13, further comprising a voltage distributing unit configured to distribute the output voltage and supply a distributed output voltage to the comparing unit.

15. The DC converting circuit as claimed in claim 14, wherein the clock signal generator comprises:

a reference clock configured to generate a reference clock signal using a feedback signal from the output terminal thereof and the comparison signal; and a clock buffer configured to generate and buffer the first and second clock signals based on the reference clock to thereby supply buffered clock signals.

16. The DC converting circuit as claimed in claim 13, wherein the switching transistor has a doping type different from the source transistor.

17. The charge pumping circuit as claimed in claim 1, wherein the gate voltage is approximated by the sum of the input voltage and the voltage of the first clock signal.

18. The charge pumping circuit as claimed in claim 7, wherein the gate voltage is approximated by the sum of the input voltage and the voltage of the first clock signal.

* * * * *